Nov. 26, 1963  E. A. G. SHAW ETAL  3,112,005
EARPHONES
Filed July 28, 1960  11 Sheets-Sheet 1

INVENTORS
EDGAR A. G. SHAW &
GEORGE J. THIESSEN

BY— *Smart & Biggar*

ATTORNEYS.

Nov. 26, 1963     E. A. G. SHAW ET AL     3,112,005
EARPHONES Filed July 28, 1960     11 Sheets-Sheet 3

INVENTORS
EDGAR A.G. SHAW &
GEORGE J. THIESSEN
ATTORNEYS

FIG. 7

Nov. 26, 1963   E. A. G. SHAW ET AL   3,112,005
EARPHONES
Filed July 28, 1960   11 Sheets-Sheet 5

INVENTORS
EDGAR A.G. SHAW &
GEORGE J. THIESSEN
BY— *Smart & Biggar*
ATTORNEYS Nov. 26, 1963  E. A. G. SHAW ETAL  3,112,005
EARPHONES Filed July 28, 1960  11 Sheets—Sheet 6

INVENTORS
EDGAR A. G. SHAW &
GEORGE J. THIESSEN
BY- *Smart & Biggar*
ATTORNEYS

Nov. 26, 1963  E. A. G. SHAW ET AL  3,112,005
EARPHONES
Filed July 28, 1960  11 Sheets-Sheet 7

INVENTORS
EDGAR A. G. SHAW &
GEORGE J. THIESSEN
BY
ATTORNEYS

INVENTORS
EDGAR A.G. SHAW
GEORGE J. THIESSEN
BY *Smart & Biggar*
ATTORNEYS

United States Patent Office 3,112,005
Patented Nov. 26, 1963

3,112,005
EARPHONES
Edgar A. G. Shaw and George J. Thiessen, Ottawa, Ontario, Canada, assignors to National Research Council, Ottawa, Ontario, Canada, a body corporate
Filed July 28, 1960, Ser. No. 46,030
22 Claims. (Cl. 181—23)

This invention relates to a circumaural type earphone having improved sensitivity, more uniform frequency response and a high degree of extraneous noise attenuation.

Whenever earphones are used it is desirable to couple them to the ears in such a manner that the electro-acoustic sensitivity is as high as possible and at the same time reasonably uniform throughout the range of frequencies important for the particular application in which the earphones are being used. Similarly, it is always desirable for the earphones to protect the ears as much as possible from extraneous sounds, commonly referred to as noise, which is otherwise audible in the vicinity of the wearer. In many applications where the requirements of sensitivity and fidelity are not critical and where the extraneous sound level is not high, conventional types of earphones as more fully discussed below have been found satisfactory. In some applications, however, the deficiencies in operation of such units are accentuated to such an extent that they seriously reduce the utility of the earphones in question and indeed may render very difficult the operation for which they are used. Applications in which the improved earphone performance obtainable from the present invention may be used with advantage are, for example, as follows:

(1) In communication by electro-acoustic means such as radio or telephone with a person located in a very noisy environment. This type of problem occurs in industrial establishments and is particularly common where aircraft are involved. An outstanding example is that of communication with and between flight deck personnel on aircraft carriers and crew members of aircraft.

(2) In audiometric applications where, in order to measure accurately the perceptiveness of human beings to sound, reproducibility, fidelity and high noise attenuation are very desirable attributes of the earphone being used.

(3) In applications where exceptionally high fidelity is required, as, for example, program monitoring in broadcast stations, and when listening to electrically received signals of physiological origin such as heart sounds.

For the purposes of the discussion which follows and for the description of the invention the term "sensitivity" will be used to indicate the effectiveness with which a given earphone transforms the electrical energy with which it is supplied into sound pressure to which the ear responds. "Fidelity" will, in the present context, be a measure of the uniformity of sensitivity across the audible spectrum. "Noise attenuation" will be a measure of the ability of a given earphone assembly to protect the ear from unwanted sounds occurring in the vicinity of the wearer and which would otherwise be heard by him.

In order clearly to distinguish between the entire earphone assembly, which may include a circumaural cup and cushion as well as the specific device used for transforming the electrical energy into sound waves, and such device per se, the latter will be referred to hereafter as the "driver unit" and will be understood to comprehend a number of different types of such devices (e.g., magnetic or crystal) which may be used to fulfill the function required. The particular way in which the driver unit converts electrical pulsations into sound, its electrical to mechanical characteristics, and, particularly the way in which damping of the vibrating member is accomplished, do not form part of the present invention.

Of considerable importance in the analysis of earphone characteristics, especially at low frequencies, is the concept of "effective earphone coupling volume." This term will be used to denote the magnitude (in principle expressible in volume units) of the cavity which is effectively coupled to the ear, and through which the sound pressure is dispersed. In order to establish the sound waves in the cavity, the vibrating part of the driver unit effects changes in cavity volume which manifest themselves in pressure waves to which the ear is sensitive. Similarly, noise which causes vibration of the earphone unit as a whole causes changes in the cavity volume which in turn sets up pressure waves detected by the ear. In the case of air leakages due to imperfect seals with the region of the head surrounding the ear, the noise is introduced into the cavity by means of pressure waves in the air leakage columns which in turn set up pressure waves inside the cavity.

In all these cases it is clear that the greater the volume of this cavity (or, to use the terminology used above, the greater the effective earphone coupling volume) the less will be the amplitude of the pressure waves set up in it for a given level of sound energy. Hence for a predetermined noise or signal input, a larger effective earphone coupling volume will result in correspondingly less sound pressure applied to the ear. Conversely, when the effective earphone coupling volume is made quite small, the sound waves are confined to a smaller space and greater sound pressure is applied to the ear. The word "effective" has been used intentionally in this discussion. One of the principal aspects of the present invention relates to certain improvements which can be made in circumaural earphones which include a rigid cup adapted to enclose the ear and effect, by means of a cushion mounted on the edges of the cup, a substantially air tight seal with the region of the head surrounding the ear. The volume enclosed by the whole cup (less of course space occupied by the driver unit when it is mounted inside the cup) defines the total cavity volume; but as will be discussed below, it is possible by arranging an appropriate partition or sound absorbing material in the cup so to modify the performance of the earphone that at certain frequencies not all parts of the total cavity volume defined by the cup are used effectively to couple, in an acoustic sense, the driver unit to the ear. In such circumstances it is convenient to say that the "effective earphone coupling volume" has been reduced due to its being "frequency dependent," and, as will be apparent, the recognition and application of this phenomenon is of central importance in the present invention.

Finally, in the following analysis resort will be made to the distinction between low, medium and high frequency sounds. This trichotomy, while generally unsuitable for rigorous quantitative methods, is useful in that it permits a simplified, qualitative description of the acoustic behaviour of earphone cavities, acoustic resistances and impedances, and sensitivity, fidelity and noise attenuation characteristics generally. To persons skilled in the art such simplifications are well known and the justification for their use lies in the manner in which they make possible meaningful statements about acoustic phenomena which would in many cases be very difficult if not impossible to analyse by completely rigorous methods. As a general guide it is suggested that the term "low frequencies" may be taken to cover the frequency range below about 300 cycles per second. Conversely, "high frequencies" may be described generally as those above 3,000 cycles per second.

Earphone assemblies commonly used hitherto and so-called "ear defenders" (which are related to the present invention inasmuch as they are concerned with the problem of attenuating extraneous noise) may be divided into three classes according to the manner in which they engage the ear.

(1) The insertion type which fit into the ear channel. Viewed as an ear defender, this type might be considered a simple "ear plug."

(2) Units which are pressed against the auricle, as for example most earphones at present used in studio monitoring and the common type of telephone receiver.

(3) The circumaural type in which the unit is mounted in or forms part of a cup on the edge of which is attached a cushion, hitherto commonly made of a soft material such as leather padded with kapok, adapted to engage with the region of the head surrounding the ear.

It is with this last type, the circumaural earphone assembly that the present invention is primarily concerned. Nevertheless units embodying the principles of the present invention may be used in many of the applications for which those of the second type listed above are now commonly employed.

In general it has been found that the undesirable characteristics of the second and third types are related, although some of these may be more acute with units which are pressed against the auricle than with the circumaural type. The defects may be summarised as follows:

(1) Many existing units do not provide a good air seal between the ear and the free atmosphere surrounding the head. This effect is of course accentuated in the case of earphones which are merely pressed against the auricle; it is nevertheless still present in circumaural units where the cushion does not make a substantially air tight seal with the region of the head surrounding the ear. When this occurs columns of air extend from the outer atmosphere in to the earphone coupling cavity. The inertia of these columns of air is not, in general, sufficient to prevent transmission of low frequency sound, with the result that an appreciable part of the low frequency signal is allowed to escape, thereby rendering the low frequency sensitivity relatively poor and subject to variation. Conversely, low frequency noise is allowed relatively free access into the ear.

(2) Even where a good air seal is obtained and air columns are not responsible for any appreciable low frequency leakage, at very low frequencies, such as below 100 c.p.s. where the inertia of the cup is of itself insufficient to keep at very low levels the amplitude of cup vibration, the cushion is not designed to prevent the earphone assembly from vibrating. From the point of view of sensitivity this of course permits some of the very low frequency signal energy to leak away from the ear. For the same reason it is also possible for very low frequency noise to set up vibrations of the assembly as a whole and be transmitted into the earphone coupling cavity and hence to the ear. This phenomenon causes reduced earphone sensitivity and increased penetration of noise at very low frequencies even in those cases where the cushion provides an adequate air seal and the cup is sufficiently rigid that it does not itself permit appreciable flexural vibrations.

The first of these two difficulties may obviously be avoided by proper design of the cushion to ensure that a good air seal is obtained with the region of the head surrounding the ear. Techniques for accomplishing this result have been known for some time; their adoption and the resultant freedom from air leakages will be taken for granted in the descritpion of the invention which follows since the presence of any substantial air leakages could easily vitiate the advantages which can be obtained from adopting the improvements to earphones which are the subject of this invention. As regards the second problem, that of restraining the amplitude of cup vibration, it is possible to design a cushion which not only provides a good air seal but also has a high enough spring constant that very low frequency vibration is substantially reduced in amplitude. Such a cushion, applied to an ear defender, is fully described and claimed in our United States Patent No. 2,801,423 of August 6, 1957. The improvements to earphone assemblies which comprise the present invention are likely to be of value even in applications where a seal of this type is not used; nevertheless the improved performance they yield will usually be enhanced by providing a seal which, by reducing the amplitude of very low frequency vibration of the cup, substantially lowers the entry and exit of very low frequency noise and signal, respectively.

Even where the best available methods are adopted for reducing the two types of undesirable effects listed above, two further defects remain.

(3) Existing earphones have invariably been designed with insufficient cavity volume to provide adequate attenuation of low frequency noise sounds. It is again at the low frequency end of the sound spectrum that the problem is important because it is only here that the cup vibration and residual air leakages are significant; at higher frequencies the inertia of the cup and of the leakage columns of air are sufficient to reduce to a comparatively low level the amplitude of noise transmitted into, and signal transmitted out of, the earphone coupling cavity. Simply to increase the size of the cavity is no solution since the sensitivity of an earphone is approximately inversely proportional to the volume of the cavity (i.e., the earphone coupling volume) except at high frequencies. To obtain sufficient sensitivity at the sound frequencies which are most important for voice communication (roughly 300 to 3,000 cycles per second), it has generally been considered essential to keep the volume of air in the cavity to the minimum which is consistent with physical comfort. This will of course occur automatically when the earphone is pressed against the auricle and has also been considered hitherto a primary design objective with circumaural type earphones. In effect, therefore, according to traditional design principles the efficiency of an earphone in excluding noise is deliberately (or perhaps in some cases accidentally) sacrificed to obtain acceptable sensitivity. This is so because the designer is faced with the choice of increasing the cavity size in order to disperse over a greater volume the low frequency noise which leaks into the cavity (and thereby reducing the intensity of noise which actually impinges on the ear) or of reducing the cavity size so that the signal energy available from the driver unit is more efficiently transmitted to the ear. As has been explained above, it has hitherto been common to give priority to this second factor.

(4) Even though it has been common to make the earphone coupling cavity relatively small in most prior types of earphones, the dimensions of the cavity may still be comparable with the wave lengths of high frequency sounds, with the result that cavity resonances (i.e., standing waves) may occur within the audible range—i.e., below 15,000 cycles per second resulting in non-uniform and uncertain frequency response. It is obvious that, if the cavity size is merely increased to improve the attenuation of extraneous noise, without taking steps to impede the formation of standing waves, the problem of cavity resonances is aggravated since a relatively large range of frequencies have wave lengths of the same order as the cavity dimensions. This factor is such as to embarrass seriously any attempt to improve low frequency noise attenuation merely by increasing cavity size without at the same time taking steps to reduce or damp out high frequency cavity resonances.

We have found that the disadvantages discussed in the two paragraphs immediately above may be substantially overcome by providing a circumaural type earphone in which the effective earphone coupling volume is made frequency dependent so that at low frequencies, whereat the sound pressure is distributed in a substantially uniform manner through the whole of the cavity, it is relatively large, thereby yielding important advantages as regards extraneous noise attenuation. At higher frequencies, however, whereat the sound pressure is substantially confined to a part of the cavity in proximity with the ear, it is substantially smaller, thereby resulting in greater sensitivity and a decrease in the range of frequencies over which cavity resonances may occur.

In accordance with our invention we provide a circumaural type of earphone which includes a rigid, non-porous cup adapted to enclose the ear and define an acoustic cavity therearound. A cushion member is mounted on the edge of the cup so as to effect a substantially air tight seal with the region of the head surrounding the ear. An enclosed driver unit is rigidly attached to the cup, the driver unit having its sound emitting surface spaced from but facing the ear so that it radiates sound both towards the ear and into the cavity. Means are disposed within the cup having frequency dependent sound permeability such that the sound pressure penetrates substantially the whole of the cavity at low frequencies, but is substantially confined to the regions of the cavity adjacent the ear at high frequencies. In accordance with one specific embodiment of our invention, the said frequency dependent sound permeability means comprises a partition, including the driver unit, disposed in the cup so as to divide the cavity into inner and outer sections. The partition provides coupling between the two sections by means having predominately resistive or inertial effects, as the case may be, whereby at low frequencies the inner section makes a substantial contribution to the effective earphone coupling volume, while at high frequencies the inner section becomes progressively less important. In accordance with another embodiment of our invention, the said frequency dependent sound permeability means comprises a distribution of porous sound absorbing material disposed within the cup so as to occupy the region therein surrounding the driver unit and extend from the periphery of the driving surface thereof to the periphery of the cup. In another embodiment of our invention we mount an inner cup, having a plurality of ports or openings around its periphery, within the first-mentioned cup, and dispose sound absorbing materials in at least the region between the two cups. In such embodiment, the ports and sound absorbing materials provide the required frequency dependent sound permeable means.

It is thus an advantage of our invention that improved earphone performance is obtained by providing a circumaural type earphone in which the effective earphone coupling volume is frequency dependent so that at low frequencies it is relatively large, but at higher frequencies it is appreciably smaller.

It is also an advantage of our invention that it is possible to use an earphone having a relatively large total cavity volume useful for attenuating low frequency noise and at the same time secure satisfactory high frequency response by partly filling the cavity with a sound absorbing porous material adapted to prevent the formation of standing waves.

It is also an advantage of our invention that improved uniformity of medium and high frequency sensitivity, and therefore better fidelity, can be obtained by filling at least part of an earphone coupling cavity with a porous sound absorbing material adapted to impede the formation of standing waves.

These and other advantages of our invention will become apparent as the following description proceeds. Reference will be made to the attached figures of drawings in which.

Figure 1:
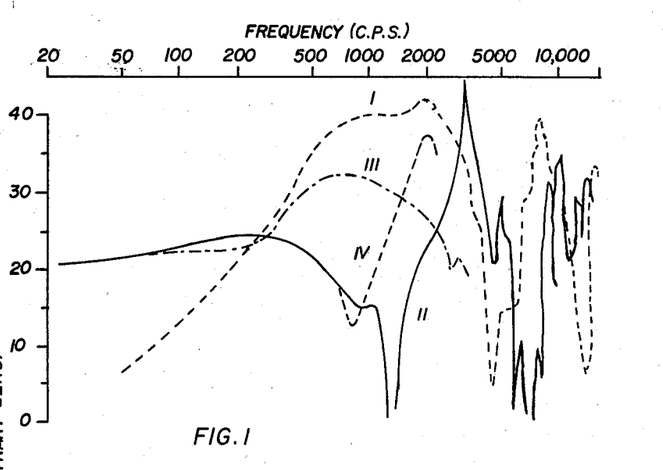
FIGURE 1 is a graph containing a number of curves showing the sensitivity indicated in decibels (db) referred to an arbitrary zero plotted against frequency in cycles per second (c.p.s.), for a number of earphones, including those of a type commonly used hitherto.
Figure 3:
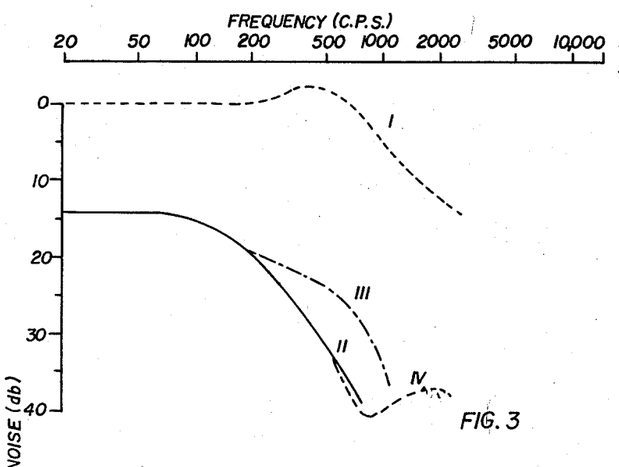
FIGURE 3 is a graph showing curves of attenuation of noise, measured in decibels, plotted against frequency in cycles per second, for the types of earphone whose sensitivity characteristics are shown in FIGURE 1.

Referring now to FIGURES 1 and 3, the curves marked I illustrate in an extreme form some of the deficiencies of conventional earphones. Curve I of FIGURE 1 shows the earphone sensitivity (i.e., the sound pressure level at the ear with constant driving voltage) and curve I of FIGURE 3 shows the corresponding graph of noise attenuation versus frequency. Both these curves represent the performance of an earphone fitted with a hard sponge rubber cushion which engages with the auricle and encloses a volume of about 15 cc. This type of earphone is commonly used in audiometry and in program monitoring. It is clear from FIGURE 1 that the earphone has maximum sensitivity in the 1000 to 2000 c.p.s. region with a continuous fall in response below 1000 c.p.s. and reaching a very low level at 100 c.p.s. The corresponding curve in FIGURE 3 shows that there is very little attenuation of noise below 1000 c.p.s. This poor low frequency sensitivity and noise attenuation is due largely to air leakage which is subject to large variations depending on how closely the hard cushion engages with the auricle. Corresponding variations in earphone sensitivity and noise attenuation are therefore to be expected. The poor attenuation of noise may also be attributed in part to the small cavity volume.

Figure 5:
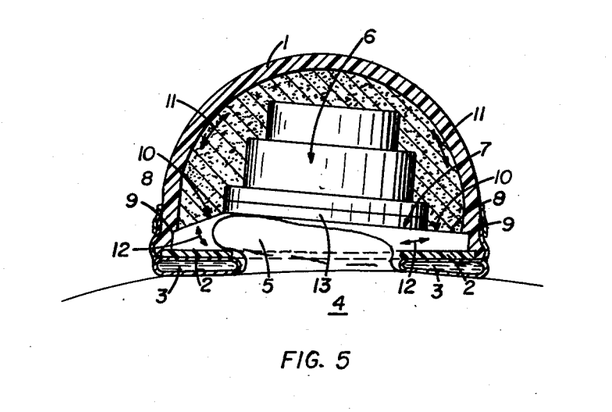
FIGURE 5 is a horizontal sectional view of an earphone, shown in position on the head of the user, which has a partition extending across the cup to divide the cavity into inner and outer sections.

We now proceed to consider the characteristics of a circumaural earphone which includes a relatively large, rigid non-porous cup member which is sealed to the region of the head around the ear by means of a cushion having a high spring constant. The driver unit for the earphone is mounted inside the cup and is provided with electrical connections which extend through the cup. This construction is generally as shown in FIGURE 5, except that the disk 8 and porous material referred to below are omitted, and serves to illustrate what happens when the total cavity volume is increased and partly partitioned by the driver unit. As shown in FIGURE 5, a rigid non-porous cup 1 is provided with an inwardly protruding flange 2 around the cup edges. A cushion member 3 is attached to the flange and is adapted to effect a substantially air tight seal with the region of the head 4 which surrounds the auricle 5 when the earphone is held in place over the ear. A driver unit 6 is mounted inside the cup, by any suitable means, and has its front surface 7 (the surface through which the sound is emitted) spaced from but facing the ear. Provision is of course made for bringing the electrical leads for the driver unit through the cup wall at some convenient point.

In this case at low frequencies the effective earphone coupling volume comprises the hole of the space inside the cup, except of course that occupied by the driver unit and the auricle itself. At high frequencies that part of the volume which is mainly behind the plane containing the front surface of the driver unit is partly uncoupled from the rest and the effective earphone coupling volume is reduced.

The characteristics of such an arrangement are shown in curves II of FIGURES 1 and 3. In FIGURE 1 the two resonances cause a sharp minimum of sensitivity just above 1000 c.p.s. and a sharp peak of sensitivity just above 3000 c.p.s. Referring to FIGURE 3 it is clear that the increase in the cavity size, among other things, has very substantially improved attenuation of extraneous noise to the extent that it is now better than 20 db at 200 c.p.s.

A greatly improved sensitivity curve may be obtained if now we add to the device described immediately above a partition which extends to the walls of the cup and which has more carefully controlled acoustic properties. As shown in FIGURE 5, an annular disk 8 extends across the cup between the outer periphery of the front surface 7 of driver unit 6 and the wall of the cup to which it is rigidly attached as at 9. This forms a partition, generally represented at 10, which includes the disk 8 and the driver unit 6, dividing the total acoustic cavity into an inner section 11 adjacent the base of the cup and outer section 12 as shown. The inner section 11 contains the body of the driver unit 6 whose front surface 7 faces into the outer section 12 which of course is adapted to receive the auricle 5. In this figure the partition is shown in symbolic form and is intended to represent any of a number of specific types, examples of which will be discussed below; all such partitions, however, provide some type of frequency dependent coupling between the sections 11 and 12.

The curves marked III in FIGURES 1 and 3 show the characteristics of a unit of this type in which the partition presents considerable resistance to airflow between the two sections of the cavity by means of a relatively large number of small holes in disk 8. In the particular type of earphone whose characteristics are shown here, the inner section has a volume of about 80 cc. and the outer section has a volume of about 40 cc. The disk 8 is a sheet of metal 0.4 mm. in thickness perforated with sixty randomly distributed holes 0.37 mm. in diameter. Comparison of curves III and II in both FIGURES 1 and 3 shows that, at low frequencies where the two sections behave essentially as one, neither the sensitivity nor the noise attenuation curves differ significantly from those obtainable from a unit with only a partial partition, or indeed, no partition at all. However, between 300 and 2000 c.p.s. the sensitivity is greatly increased while the noise attenuation is reduced but is nevertheless still adequate. We may say that this result has been achieved because the presence of partition 10 makes the effective earphone coupling volume a function of frequency. At low frequencies the acoustic resistance (i.e., resistance to air flow) presented by the partition is not of sufficient importance to prevent substantial coupling of the two sections of the cavity so that they behave essentially as one; at medium and high frequencies the partition presents sufficiently high acoustic resistance that, when combined with the acoustic reactance of the inner section 11, it forms a filter system which prevents any substantial penetration of high frequency sound into the inner section. The result is that the system still provides the degree of attenuation of extraneous low frequency sounds obtainable with large cavity volumes and which is of great importance in many types of noisy environments, as for example aboard aircraft. At the same time it also provides high earphone sensitivity in the 300 to 3000 c.p.s. region which is important for high speech intelligibility. Those skilled in the art will recognize that similar results could be obtained with a variety of partitions which differ in physical form but which have similar acoustic properties. If the entire partition is itself sufficiently rigid or massive that its own vibration is negligible, the only parameter of significance is the acoustic resistance. In the unit described and whose characteristics are shown in curves III of FIGURES 1 and 3 the resistance is estimated to be about 8 dyne-seconds cm$^{-5}$. Further examples of this type of unit would be those in which the disk (which of course is the part of the partition whose design permits of variation to provide different types of coupling between the cavities) is composed of a rigidly supported or sufficiently massive fabric having appropriate flow resistivity or, in the alternative, somewhat larger holes in a rigid metal disk which are covered with a fabric having appropriate flow resistivity. More specific examples of this type of construction will be discussed in connection with the embodiments described with reference to FIGURES 8, 9, 10 and 11 below.

A somewhat different but useful result is achieved if the disk is perforated with only a few or even one hole of much greater diameter. In this case it is the inertia of the air moving through the hole or holes which dominates the operating characteristics of the device. With this "inertia type" of partition the earphone sensitivity passes successively through a minimum and a maximum as the frequency increases. The frequencies and sharpness of the minimum and maximum may be adjusted by properly choosing the number, size and shape of the hole or holes. The construction of a specific embodiment of this type of earphone will be discussed below in connection with FIGURE 14.

Those skilled in the art will recognize that the effect of a rigid partition with relatively few large holes may be duplicated by an arrangement which provides equivalent acoustic mass and damping. More particularly, the partition may be made substantially airtight (thereby obtaining the advantage of excluding dirt from the inner cavity) but having flexible parts which are able to move. Here disk 8 would be composed at least in part of a flexible membrane. "Flexible" in this context is defined to means that the compliance of the partition embodying such parts is greater than that of the air of the inner cavity 11 itself. The performance of a system of this type having a partition which includes plasticized polyvinyl chloride sheet of 0.1 mm. in thickness and 20 cm.$^2$ in area separating inner and outer cavities which are 80 cc. and 40 cc. in volume, respectively, is illustrated by curves IV of FIGURES 1 and 3. In this case FIGURE 1 shows a minimum and maximum sensitivity at 700 and 2000 c.p.s., respectively, but, as explained above, the exact frequencies at which these occur may be varied by changing the mass per unit area and the total area of the flexible portion of the partition. On the other hand the sharpness of the minimum and maximum depends on the internal damping of the material used. Reference to curve IV of FIGURE 3 shows that the extraneous noise attenuation of units having a large total cavity volume has not been sacrificed by using a partition of this type having predominantly "inertia" effects.

Figure 2:
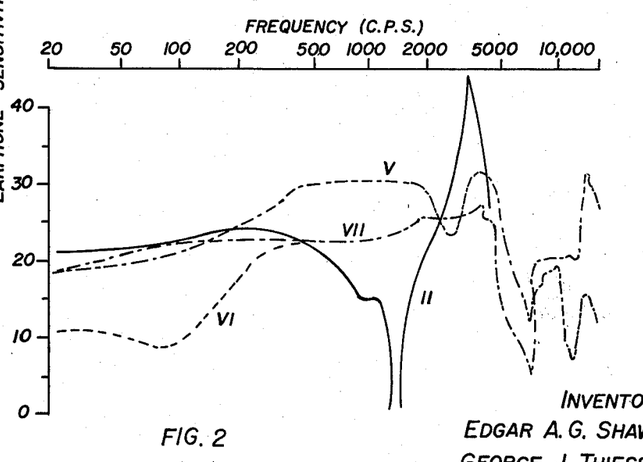
FIGURE 2 is a graph similar to FIGURE 1 showing sensitivity characteristics for other types of earphones, in addition to which curve II of FIGURE 1 has been shown for the purposes of comparison.
Figure 4:
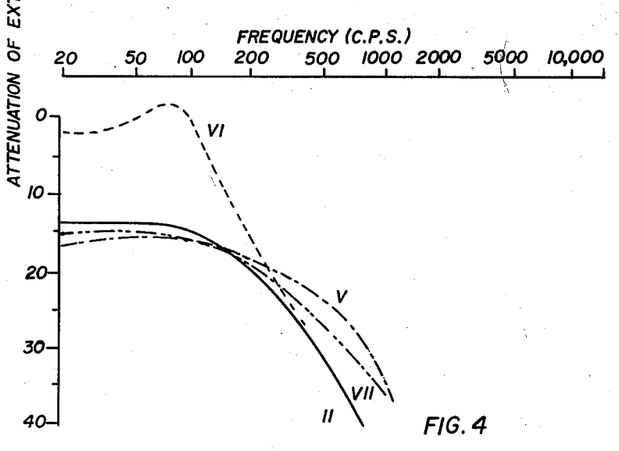
FIGURE 4 is a graph similar to FIGURE 3, showing the noise attenuation characteristics for the earphones whose sensitivity curves are given in FIGURE 2.

In order to obtain more uniform medium and high frequency response we have found it advantageous to fill one or more of the sections 11, 12 with a porous sound absorbing material. The curve V of FIGURES 2 and 4 show the characteristics of a unit using a rigid "resistive type" partition having sixty small holes as described above when both the inner and outer sections contain sound absorbing material. Two important and useful results are obtained. Firstly, the large fluctuations in earphone sensitivity above 3000 c.p.s. manifested by units having characteristics shown by curve II have now been largely eliminated. Secondly, the attenuation of low frequency noise has been increased by about 2 db and, incidentally, the earphone sensitivity has been reduced by the same amount. The first result is due to the damping of high frequency resonances by the porous material located in the outer section 12 and which takes effect mainly by reason of its impeding the formation of standing waves. The second is a consequence of the isothermal wave motion which occurs in porous materials at sufficiently low frequencies. (See L. L. Beranek "Acoustics," page 220; McGraw-Hill Book Company Inc., New York, 1954.) In this particular example a foamed isocyanate resin having an open structure, marketed in Canada under the trademark "Collo All Foam," and having an estimated flow resistance per unit thickness of about 50 dyne-seconds cm.$^{-4}$ almost completely fills the inner section and fills about 20% of the outer section, it, of course, being necessary in the outer section to leave adequate space free from obstruction to accommodate the auricle and permit radiation of sound from the driver unit. In this particular case the porous materials is not placed in the immediate vicinity of the holes through the disk 8 in order to preserve the acoustic resistance characteristic of the partition. Those skilled in the art will, however, appreciate that the porous materials may be allowed to cover the holes provided they are enlarged or increased in number to restore the desired value of acoustic resistance provided by the partition. It will also be noted that the usefulness of this aspect of the invention is not restricted to any particular type or amount of porous material.

The importance of the proper cushion design is emphasized by curves VI in FIGURES 2 and 4. Even assuming that a substantially air tight seal is obtained, if the spring constant of the cushion is not appreciably greater than that of the air cavity the earphone sensitivity at very low frequencies is reduced owing to unrestrained cup vibration. Similarly, the attenuation of the very low frequency noise sounds is also reduced and may even be negligible. Hence in all embodiments of the invention it is beneficial to use a circumaural cushion having a high spring constant as described in our above identified patent.

It is possible in a further embodiment of the invention to use sound absorbing material itself to provide the required frequency dependent sound permeable means, instead of the discrete partition used in connection with the embodiments of the invention represented by FIGURE 5. Such material would occupy most of the available cavity volume apart from that required to accommodate the auricle and the driver unit with its rigid support. Curves VII of FIGURES 2 and 4 show the characteristics of an earphone of this type. In this case the flow resistance per unit thickness of the porous material is estimated to be about 250 dyne-seconds cm.$^{-4}$ which is some five times greater than that required when a properly designed resistive partition divides the two cavities. The high flow resistance prevents appreciable penetration of sound into regions of the cavity remote from the ear except at low frequencies. This arrangement is capable of yielding very uniform earphone sensitivity over a wide frequency range together with a high attenuation of extraneous noise. Nevertheless, as is clearly shown in FIGURE 2, the sensitivity is relatively low at the medium frequencies as compared with the other types of earphones whose characteristics are shown. Such being the case, units of this type may prove more suitable for studio monitoring and other applications where fidelity is of primary importance rather than in speech communication systems where relatively high sensitivity to medium frequencies is required for optimum intelligibility.

Figure 6:
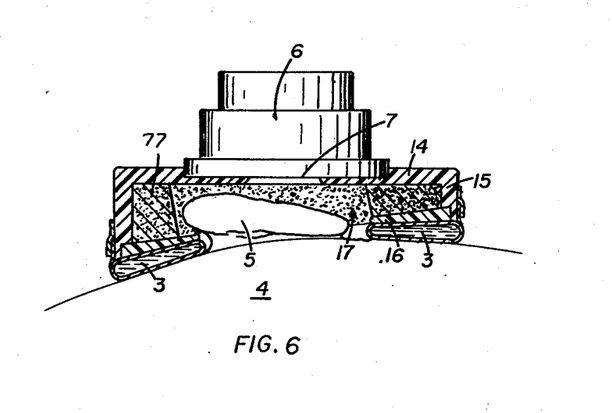
FIGURE 6 is a horizontal sectional view of another type of earphone which uses a relatively small cavity partially filled with a porous sound absorbing material.

Useful results will be obtained from filling earphone cavities with porous sound absorbing materials in units other than those having large acoustic cavities. The action of such material in damping out high frequency resonances by reason of preventing the formation of standing waves will be present even though the structure is such that the effective earphone coupling volume is not appreciably frequency dependent in the range 300–3000 c.p.s. In particular, where noise attenuation characteristics are not of fundamental importance, it may be desirable to have a relatively small total cavity volume. Much improved uniformity of high frequency response (i.e., greater fidelity) may then be obtained by placing in the cavity porous material having sound absorbing qualities. Such a unit is shown in FIGURE 6. A driver unit 6 has its front surface 7 attached to an annular plate 14 having around its periphery a short tubular section 15 which in turn supports an inwardly extending annular flange 16 to which cushion 3 is attached. The arrangement thus defines a relatively small cavity 17 which is adapted to receive the auricle 5 as shown. Porous material 77 of relatively high flow resistance per unit thickness (estimated to be about 500 dyne-second cm.$^{-4}$ in a typical case) is placed in the generally annular shaped space defined by the plate 14, tubular section 15 and flange 16, thereby filling part of the cavity but leaving sufficient unobstructed space to accommodate the auricle.

Reference will now be made to FIGURES 7 to 17 which show specific earphone units in the design of which the principles discussed above have been applied.

Figure 7:
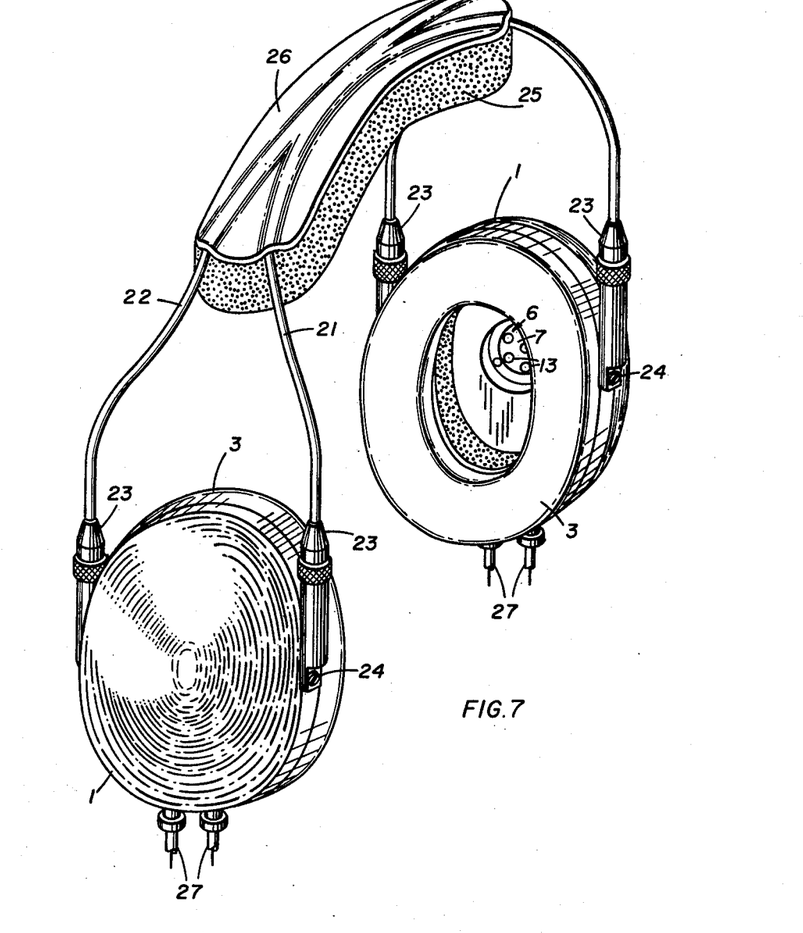
FIGURE 7 is a perspective view of an entire headset assembly made in accordance with the invention.

FIGURE 7 illustrates a complete headset having relatively large circumaural earphones adapted to embody the improvements which are the subject of this invention. Rigid non-porous cups 1 are provided for each ear and are joined together over the top of the head by means of two spring bands 21, 22 which are fastened together along their middle portions. The lower ends of each of the bands 21, 22 are gripped by means of an adjustable collet type fastening member 23 whose lower end is connected rotatively to the cups as at 24. The rotatable connection between the lower end of the fastening member 23 and the variation in effective lengths of the bands 21, 22 which the collet type connection allows, facilitate fitting the headset to different wearers and ensure that the earphones are pressed in against the region of the head surrounding the ears. If desired a sponge rubber or foam plastic pad 25 may be cemented to the leather strip 26 which covers the middle portions of the spring bands 21 and 22. The edge of each cup 1 is provided with a circumaural cushion 3 which is adapted to effect a substantially air tight seal with the region of the head surrounding the ear and which preferably has a high spring constant as taught in our above-mentioned patent. The driver unit 6 having the conventional sound emitting apertures 13 in its front surface 7 is rigidly mounted inside the cup by any suitable means, the surface 7 of course being oriented towards the cup opening so that it will face, but be spaced from, the ear when in position on the head of the user. The electrical connections 27 from each driver unit may be brought out through the cup wall in any suitable manner, preferably near the bottom of the cup so that the headset cables provide a minimum amount of obstruction to the wearer.

Figures 8, 9, 10, 11:
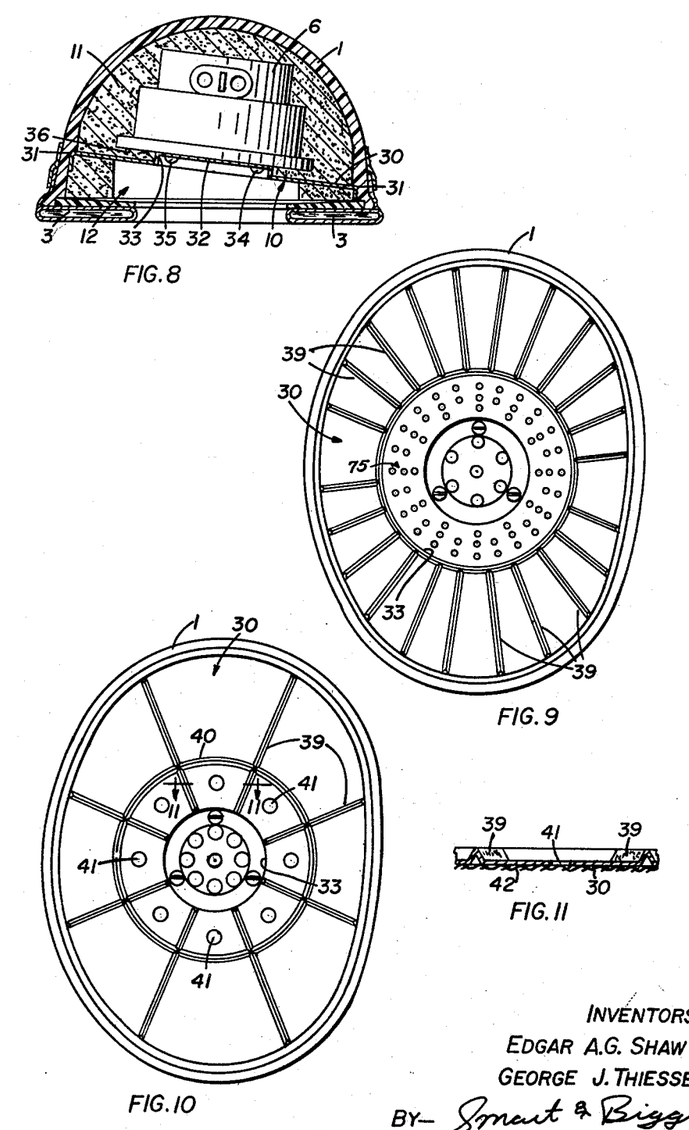
FIGURE 8 is a cross-section of an earphone made in accordance with the present invention, showing the cup, cushion, disk which forms part of the partition, and the driver unit.
FIGURE 9 is a plan view of one type of disk which may be used with the unit shown in FIGURE 8, in order to produce a partition having predominantly resisitive characteristics.
FIGURE 10 is a plan view of another type of disk, also having predominantly resistive characteristics, which may be used in the unit shown in FIGURE 8.
FIGURE 11 is a cross-section taken on lines 11—11 of FIGURE 10.

FIGURE 8 shows a cross-section of an earphone suitable for use with a number of different types of partition. The cup 1 may be formed of plastic so long as it is sufficiently rigid to impede flexural vibrations. The edges of the cup are joined to cushion 3 preferably having a high spring constant and, as described in our above-mentioned patent, formed from a plastic tube partially filled with a liquid. Such a cushion will provide a substantially air tight seal and a high spring constant which tends to impede low frequency vibration of the cup as a whole; so far as intermediate and high frequencies are concerned the mass of the cup itself is ordinarily sufficient to reduce to negligible amounts this type of sound leakage. An annular disk 30, which together with driver unit 6 forms a partition generally indicated at 10, extends across the cup and is rigidly joined around its periphery to the cup walls by means of a suitable flange 31 moulded on the inside surface of the wall as shown. This partition divides the total space inside the cup into an inner section 11, adjacent the bottom of the cup, and an outer section 12. A circular aperture 32 is left at the centre of the disk and its edges are bent to form a very short cylindrical section 33 terminating in an inwardly extending mounting flange 34 as shown. The driver unit 6 is attached to the disk with its front surface 7 rigidly connected to the mounting flange 34 by means of a suitable fastening arrangement such as machine screws 35. The circular aperture 32 is of course designed to permit unobstructed radiation from the sound emitting apertures 13. The mounting arrangement is such that the short cylindrical section 33 causes the front surface 7 of driver unit 6 to be aligned parallel to, but slightly behind the main radial part of disk 30, thereby forming an annular space 36 between the outer portions of face 7 and the inner portion of the disk 30.

As discussed above, more uniform frequency response can be obtained by filling either or both sections 11 and 12 with a porous sound absorbing material as shown, care being taken not to obstruct operation of the holes, or flexible membrane or other type of means used to provide a frequency dependent coupling between the sections.

The actual construction of disk 30 may take a number of forms of which two are shown in FIGURES 9, 10 and 11. In FIGURE 9 radial stiffening ribs 39 are provided and extend inwardly from the periphery of the disk to about the region of the annular space 36. In the inner region of disk 30, which serves as one boundary for the annular space 36, there are provided a number of small holes 75 which can be arranged in any more or less symmetrical fashion as shown. In this case 60 holes of 0.37 mm. diameter are used and the disk is 0.4 mm. thick; it is obvious to persons skilled in the art that considerable variation in the size and number of these holes and disk thickness may be made without substantially affecting the character of the partition.

In FIGURE 10, the ribs 39 extend all the way into the cylindrical portion 33 and a circular rib 40 is also provided. In this case about six or eight holes 41 of 3.5 mm. in diameter are spaced symmetrically in a circle in the region of the inner part of disk 30 which defines one side of annular space 36. As best shown in FIGURE 11, the holes are covered over by a light weight fabric 42 having interstices which provide the required acoustic resistance. In this particular instance a cotton broadcloth having 32 threads per cm. and a weight of 40 grams per square meter has been found satisfactory. As will be clear to persons skilled in the art it would also be possible to use a fine wire mesh instead of a fabric. Partitions using disks of the type shown in FIGURES 9, 10 and 11 are, of course, of the "resistive" type in the sense that the dominating characteristic of the coupling which such partitions effect between the two sections is its acoustic resistance.

Figures 12, 13, 14:
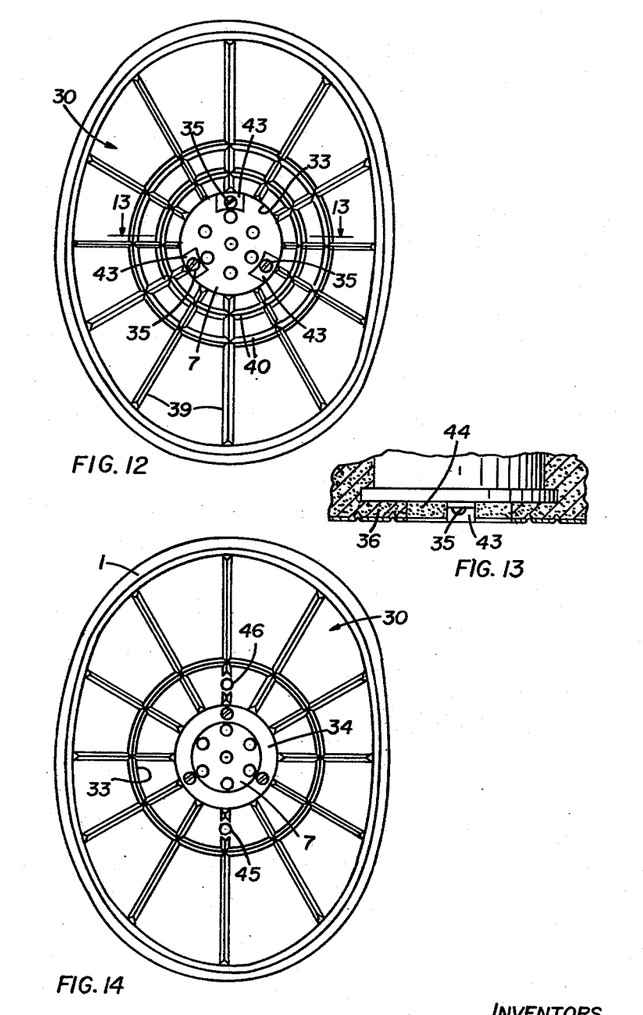
FIGURE 12 is a plan view of a disk which may be used in conjunction with a unit similar to that shown in FIGURE 8, this particular type disk being used to produce a partition having a cylindrical slot surrounded by porous material as a means of providing connection between the inner and outer sections of the cavity defined by the partition, and thus having predominantly resistive characteristics.
FIGURE 13 is a fragmentary view, in section, of the connection between the disk of FIGURE 12 and the driver unit, showing the location of the cylindrical slot and porous material.
FIGURE 14 is another type of disk suitable for use in a unit similar to that shown in FIGURE 8, which disk produces a partition having predominantly inertia characteristics.

A further "resistive" type partition is shown in FIGURES 12 and 13. In this case, the cylindrical section 33 and the inwardly extending mounting flange 34 to which it is connected are removed except for three small mounting feet 43 which, together with machine screws 35, are adapted to connect the disk 30 to the front face 7 of the driver unit 6. The result is that a generally cylindrical slot 44, interrupted only by mounting feet 43, is formed between the edge of circular aperture 32 and the front surface 7. The annular space 36, is, with the exception of the mounting feet 43, then open at both ends. As in previous cases radial ribs 39 and circular ribs 40 are provided in order to impart rigidity to the disk 30. To provide the required resistive connection between inner section 11 and outer section 12 the space 36 is in this instance filled with a foam plastic having a low flow resistance per unit thickness, for example about 10 dyne-seconds cm.$^{-4}$.

FIGURE 14 shows a design of a disk suitable for use in a partition having mainly "inertia" effects. This disk is similar to that shown in FIGURE 10 and hence has a continuous but short cylindrical section 33 with the inwardly extending mounting flange 34. Radial ribs 39 are also provided. In this case, however, only two holes 45, 46 are used and these extend through the inner part of disk 30 in the region thereof which forms one side of the annular space 36. The diameter of the holes is in each case of the order of 2 mm., they are left unobstructed and the inertia of the air column through them is such that the degree of connection they afford between the two cavities is frequency dependent.

Figure 15:
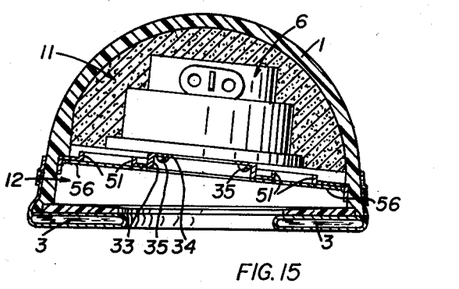
FIGURE 15 is a cross-section of another type of earphone with a partition which includes a disk having apertures covered with a flexible membrane.
Figure 16:
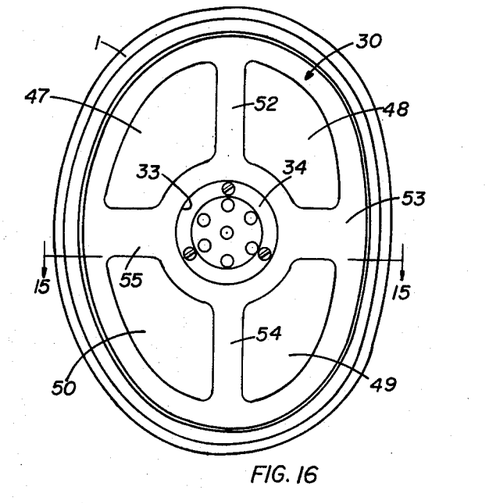
FIGURE 16 is a plan view of a disk suitable for use in the unit shown in FIGURE 15, which disk produces a partition having predominantly inertia characteristics.

An analogous type of partition having predominantly "inertia" effects is shown in FIGURES 15 and 16. Here the disk 30 is provided with a central short cylindrical section 33 and inwardly extending mounting flange 34 as discussed above, but four relatively large windows 47 to 50 are formed in the disk in such a manner that the edges of the windows are formed into thin vertical ribs 51 which impart rigidity to the disk. The windows are separated by four spoke members 52 to 55 of which the two shorter, 53, 55 may conveniently be made about twice as wide as the longer spokes 52, 54. A flexible membrane 56 is then attached to the surface of the disk which faces the outer cavity 12. In the present case the membrane 56 is composed of a sheet of Vinylite 0.1 mm. thick. With this arrangement the inertia of the Vinylite sheeting is such as to provide a varying degree of coupling between the inner and outer sections. As before, the inner and outer sections can advantageously be filled with a porous sound absorbing material, care being taken, however, to make sure it does not impede vibration of the membrane.

Figure 17:
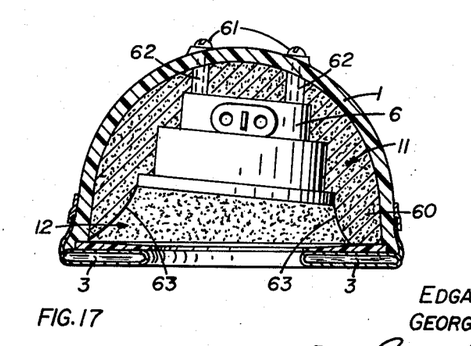
FIGURE 17 is a cross-section of yet another type of earphone in which part of the cup is filled with a porous sound absorbing material, said material itself providing the required frequency dependent sound permeable means.

In FIGURE 17 an embodiment of the invention is shown in which there is no actual metal disk 30. In this case porous sound absorbing material 60 is placed at the bottom of the cup and extends outwardly adjacent to the cup sides as shown. The driver unit 6 is rigidly attached to the cup in any convenient manner, for example by means of machine screws 61 and spacers 62. The porous sound absorbing material completely fills the region of the cup surrounding the back part of the driver unit 6 and also extends from the periphery of the front face 7 out to the edges of the cup as shown, thereby forming an outer surface 63 of generally conical shape. Such a distribution of porous sound absorbing material in itself provides the required frequency dependent sound permeable means, since the resistance to air flow present by the porous material 60 renders frequency dependent the portion of the acoustic cavity which is included in the effective earphone coupling volume with the result that the latter decreases with increasing frequency. Moreover, as discussed above, the presence of the porous material inhibits the formation of standing waves and thus smooths out the high frequency response.

Reference will now be made to FIGURES 18 to 21 inclusive, which illustrate the construction, operating characteristics, and a possible theoretical analysis thereof, of embodiments of the invention different from those previously described, which use an inner cup, in addition to the (outer) rigid cup required in connection with earphones made in accordance with the preceding figures of drawings. Experimental work has shown that earphone construction of the type now to be described yields an exceptionally uniform frequency response, and an attenuation of extraneous sound almost equal to that of the ear defender per se described in the above mentioned United States patent. As a result, these embodiments of the invention are particularly suitable for high fidelity listening and audiometry.

Figure 18A:
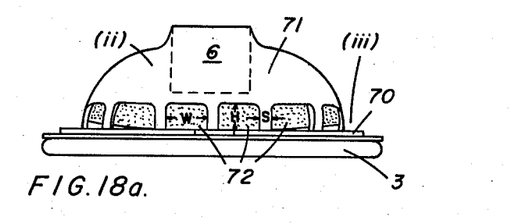
FIGURES 18a, b, and c show another embodiment of the invention wherein two cups are used, one within the other, FIGURES 18a and b respectively being side and top views with the outer cup and porous sound absorbing material removed, and FIGURE 18c being a sectional view along line C—C of FIGURE 18b.

Referring now to FIGURES 18a, b, c, a rigid cup 1 is provided, having an inwardly extending flange 70 mounted around the periphery thereof. A cushion 3 is in turn mounted on the flange in a manner similar to that described in connection with the previous figures. An inner cup 71, having a plurality of ports or openings 72 is disposed within the cup 1, preferably in such a way that the periphery of the inner cup 71 (or at least such of it as is not removed in order to form the ports 72) can be rigidly attached, to the flange 70. An enclosed driver unit 6 is disposed within the base of the inner cup, with its driving surface oriented towards the ear. Porous sound absorbing material 73 is inserted in the space between cup 1 and inner cup 71, and further porous sound absorbing material 74 is disposed within most of the space within the inner cup aside from that occupied by the driver unit 6, and that needed to accommodate the ear. In one particular embodiment of this form of the invention, which was found to have the particularly good characteristics described hereafter in connection with FIGURE 19, the porous sound absorbing material 73 comprised about 7 gm. of Pyrex (trademark) brand wool filtering fibre (Corning Glass Works Catalogue No. 800) which was chosen for control purposes. The porous sound absorbing material 74 was a type of foamed plastic having interconnecting cells, being in this case flexible polyurethane marketed in Canada as Collo All-Foam. It will be appreciated by persons skilled in the art that acoustic properties may have to be controlled to obtain optimum results and that porous materials other than glass fibre or foamed plastic might be used with equal success. The driver unit 6 was a Telex "Minimike 100" (trademark) a small moving coil unit with a completely enclosed cavity behind the cone. The perforated sheet metal cap at the front of the Telex driver unit was removed or replaced with a wire mesh cap to extend the response. This driver unit was cemented to the inner cup 71 which in turn was cemented to the flange 70.

Figure 18C:
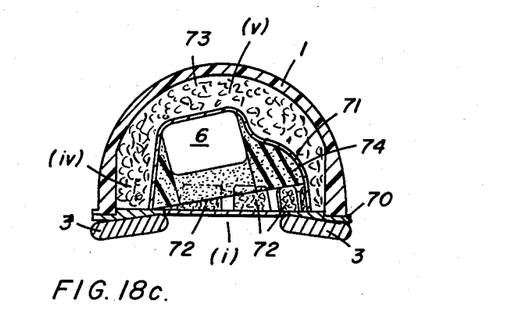
Figure 19:
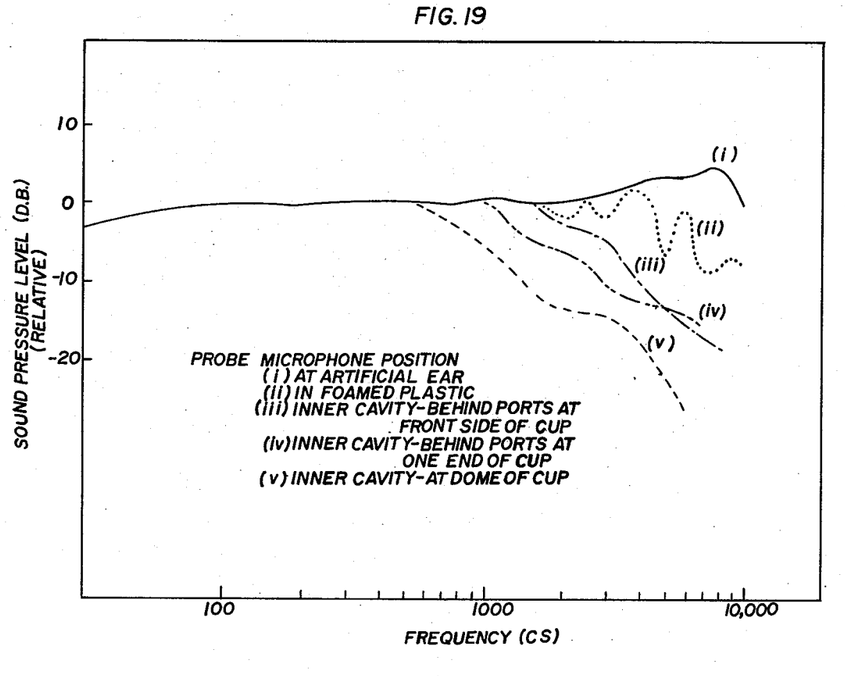
FIGURE 19 is a graph showing a number of curves characteristic of the embodiment of the invention shown in FIGURE 18, FIGURES 20a, b and c are schematic drawings useful in formulating an analysis of the characteristics of the embodiment of the invention shown in FIGURE 18, and FIGURES 21a and b are, respectively, a top plan view, with the outer cup and porous sound absorbing material removed, and a sectional view along line B—B of FIGURE 21a, of yet another embodiment of the invention similar to that illustrated in FIGURE 18.

FIGURE 19, which shows graphs of relative sound pressure level (SPL) versus frequency, measured at five positions within a typical earphone of the type just described, illustrates the way in which the earphone behaves when the driver unit 6 is excited. Curve $i$ was obtained with the orifice of the microphone probe tube at the artificial ear (i.e., location $i$ in FIGURE 18c) and therefore gives the actual frequency response presented to the ear. Curve $ii$ shows the SPL at a point near the upper surface of the foam adjacent the driver unit 6 (location $ii$ in FIGURE 18a). Curves $iii$ and $iv$ refer to locations in the space between the cup 1 and the inner cup 71, just behind the ports, illustrated by location $iii$ and $iv$ in FIGURES 18a, c, respectively. Finally, curve $v$ refers to a location in the space between the cup 1 and the inner cup 71 at the dome of the former and hence remote from the port system, as shown by location $v$ in FIGURE 18c.

Below 500 c.p.s., the SPL is the same at all locations showing that the sound fully penetrates all parts within the cup 1. At 500-600 c.p.s. the SPL at location $v$ starts to fall below the level at location $i$ and is significantly diminished at 1000 c.p.s. The SPL at locations $iii$ and $iv$ start to fall at 1000-1500 c.p.s. and are significantly diminished at 2000 c.p.s. Above 2000 c.p.s., therefore, sound penetrates the region between the cup 1 and the inner cup 71 to only a minor degree. At 5000 c.p.s. the sound penetration of the foamed plastic within the inner cup 71 is already much reduced (curve $ii$) and at 10,000 c.p.s., although not shown by the graphs, sound is sensibly confined to the small open space between the driver unit 6 and the ear.

Figure 18B:
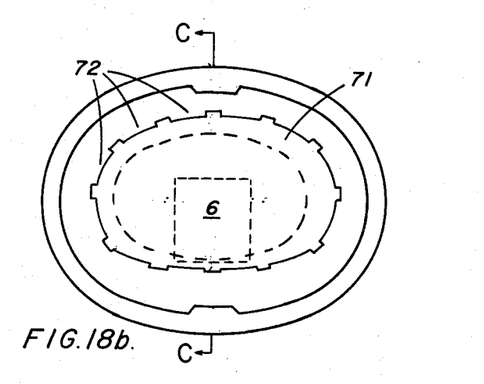

The earphone shown in FIGURE 18 attenuates extraneous noise almost as well as a plain, unencumbered ear defender, made in accordance with our above mentioned patent. This is possible because the effective earphone coupling volume comprises virtually all the available volume within the cup 1 up to about 500-600 c.p.s., above which frequency region the effective earphone coupling volume is not of primary importance in attenuating extraneous sound.

In attempting to relate the gradual change of effective earphone coupling volume indicated by FIGURE 19 to the structural elements of the embodiment of the invention illustrated in FIGURE 18, some caution must be exercised since the wavelength of sound at high frequencies is comparable with or appreciably less than the dimensions of the device. Thus while it may be expedient to describe the behaviour of the device in terms of lumped impedance elements at low frequencies, it is necessary to adopt a wave-acoustical description at the higher frequencies where the wavelength of sound is comparable with or greater than the dimensions. This is a situation which is encountered with many acoustic devices.

Bearing this in mind one may discuss the behaviour of the device shown in FIGURE 18 as follows. The inner cup 71 can be considered as a partition (analogous, for instance, to partition 10 discussed in connection with FIGURE 8) which divides the cavity defined by cup 1 into outer and inner sections. The coupling impedance between the two sections provided by the port system is dependent on the size and number of ports and on the foamed plastic which partially covers the port system. This point of view provides a reasonable explanation of the diminution of effective earphone coupling volume, which occurs essentially in the 500-1500 c.p.s. region, but cannot readily be put on a quantitative basis because the boundaries of the coupling impedance are ill defined. Furthermore it fails to explain the behaviour at higher frequencies. It has been found that the presence of ports at the periphery of the inner cup 71 contributes materially to the smoothness of the frequency response in the 1500-5000 c.p.s. region. Provisionally, one may infer that the port system helps to damp standing waves which would otherwise be present in the inner cup 71.

Figure 20A:
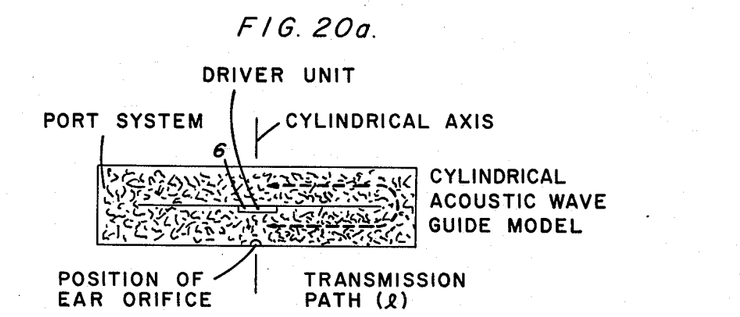
Figure 20B:
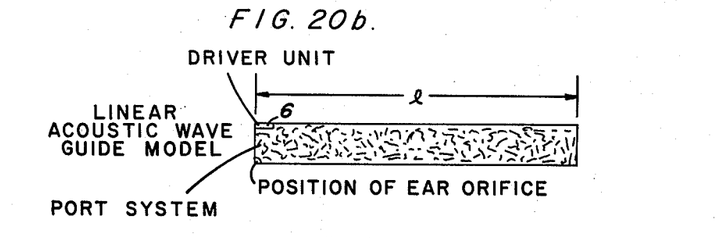
Figure 20C:
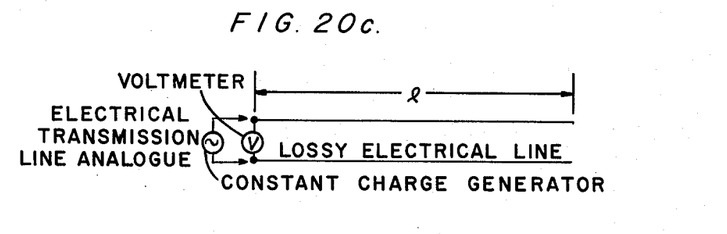

Referring now to wave acoustics, FIGURE 20a shows a model which represents the earphone of FIGURE 18 when engaged with the head. The driver unit 6 is mounted at the centre of one side of a flat disk which divides the space into inner and outer cylindrical sections coupled by an annular opening which represents the port system 72 of FIGURE 18. In the wave acoustical description, the driver unit 6 is treated as a generator and the system of cavity sections as a waveguide or transmission line connected to it. The transmission path, which is of length $l$, extends from the vicinity of the driver unit 6 through the port system 72 to the centre point of the inner section which corresponds to the cup dome (i.e., position $v$ in FIGURE 18). This model, while capable of analysis, can with advantage be further simplified by "opening out" the waveguide to the linear form shown in FIGURE 20b. Position $v$ in FIGURE 18 is now represented by a point at the end of the waveguide remote from the driver unit 6 and the ear. Finally, FIGURE 20c shows the electrical analogue of the system illustrated diagrammatically in FIGURE 20b consisting of a constant charge generator connected to a lossy transmission line open circuit at the end remote from the generator. The constant charge generator is analogous to a constant displacement (e.g., stiffness controlled) driver unit while the generator voltage is analogous to the acoustic pressure at the driver and hence at the ear which is close to it.

If the transmission line of FIGURE 20c has distributed resistance of the correct magnitude it can be shown that the generator voltage is essentially independent of frequency at low frequencies but varies approximately inversely with frequency at high frequencies. The transition between these two modes of behaviour occurs in the region where the wavelength is approximately $4l$ or $$\gamma = \frac{c}{\lambda} = \frac{c}{4l}$$

($\gamma$ is the frequency and $c$ is the propagation velocity of the transmission line). Referring again to the first model (FIGURE 20a), it is evident that the wavefront varies in size reaching a maximum at the port system 72 and falling to zero at the centre of the inner cavity—i.e., the region of the dome of the cup 1. However, it remains approximately true that a transition will occur in a frequency region near $c/4l$.

The transmission path for the design shown in FIGURE 18 is approximately 8.5 cm. in length. Assuming the velocity of sound in the sound absorbing material (in this case foam and glass fibre) to be about the same as that of air (344 metre/sec.), this would lead one to expect the transition region $c/4l$ to lie in the neighbourhood of 1000 c.p.s., in good agreement with the experimental evidence.

From the transmission line viewpoint the port system 72 is to be regarded as a discontinuity in the line, the magnitude of which particularly depends on the number and size of the ports. The simplest port arrangement would obviously be an annular slit between the inner cup 71 and the flange 70, in which case one might, at first sight, expect minimum discontinuity when the width (corresponding to the dimension $h$ shown in FIGURE 18a) approximates the spacing between the cup 1, and the inner cup 71. Actually, both experiment and theory lead to the rather surprising conclusion that the dimension $h$ may not be very critical provided the thickness of the inner cup material is less than $h$.

The port system 72 shown in the embodiment of the invention illustrated in FIGURE 18 has individual openings of width $w$ (see FIGURE 18a) much greater than the width $s$ of the "posts" between them, and therefore behaves in a very similar manner to the annulus just discussed. In the example earphone from which the curves shown in FIGURE 19 were taken, $h$ may have any value between about 0.3 cm. and 1.0 cm. without materially affecting frequency response of the earphone. The situation is rather different if the posts occupy a substantial part of the perimeter of the inner cup 71 (say $s>w$). The transition frequency may then lie well below the value of $c/4l$, in which case description in terms of lumped impedance elements is quite appropriate. In certain cases a relatively low transition frequency may be desirable to match the characteristics of the driver unit. In general, however, such a choice makes it more difficult to obtain uniform response in the 1500–5000 c.p.s. region as already indicated.

Figure 21A:
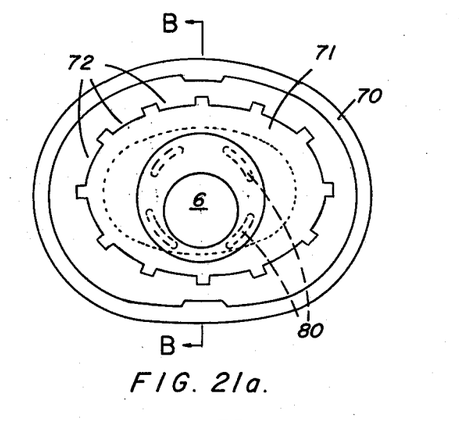
Figure 21B:
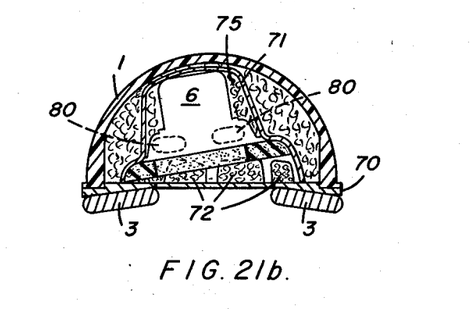

Referring now to FIGURE 21, another embodiment of the invention is illustrated which is very similar to that shown in FIGURE 18. A small cone loudspeaker of Japanese origin is in this case used as a driver unit 6 in place of the Telex "Minimike 100" used in connection with FIGURE 18. It will be noted that the inner cup 71 is shaped to provide a completely enclosed cavity behind the driver unit 6 since, in this case, the particular driver unit shown is not provided with a case so as to be a completely enclosed unit. This construction prevents the sound from the speaker vents 80 at the back of the cone from cancelling that from the front. In the embodiment illustrated the driver cavity has a volume of about 12 cm.³ over and above that occupied by the driver unit 6 and this helps to control cone movement at low frequencies. The space 75 between the driver unit 6 and the inner cup 71 contains about 1.5 gm. of porous sound absorbing material (e.g., fibre glass) to damp out high frequency resonances. It will be appreciated that in connection with the embodiment of the invention shown in FIGURE 18, a special driver cavity or "infinite baffle" enclosure is not needed with a driver unit such as the "Minimike 100" since it is already completely enclosed by the manufacturer. In the case where a small loudspeaker is used, such as is illustrated in FIGURE 21, provision of a special driver cavity or infinite baffle is required. Embodiments of the invention such as are shown in FIGURE 21 are of particular interest because of the greater sensitivity of the driver unit, thereby yielding an arrangement particularly suitable for use by the hard-of-hearing.

This application is a continuation-in-part of application Serial No. 676,178, filed Aug. 5, 1957.

What we claim as our invention is:

1. A circumaural type of earphone comprising a rigid, non-porous cup adapted to enclose the ear and define an acoustic cavity therearound; a cushion member mounted around the edge of the cup and adapted to effect a substantially air tight seal with the region of the head surrounding the ear; an enclosed driver unit rigidly attached to the cup, said driver unit having its sound emitting surface spaced from but facing the ear and being mounted so as to radiate sound both towards the ear and into the cavity; and means having frequency dependent sound permeability disposed within the cup, the sound permeability of said means being such that the sound pressure penetrates substantially the whole of the cavity at frequencies below 300 c.p.s. and substantially confines the sound pressure to regions of the cavity adjacent the ear at frequencies above 3000 c.p.s.

2. An earphone as claimed in claim 1 wherein said means comprises a partition, of which the driver unit forms part, mounted inside the cup and adapted to divide the cavity into an inner section adjacent the base of the cup and a outer section adapted to receive the ear, said partition adapted to give acoustic coupling between the sections which is greater at low frequencies than at high frequencies.

3. An earphone as claimed in claim 2 wherein at least part of the inner section is filled with porous sound absorbing material.

4. An earphone as claimed in claim 3 wherein at least part of the outer section is filled with a porous sound absorbing material.

5. A circumaural type of earphone comprising a rigid, non-porous cup adapted to enclose the ear and define an acoustic cavity therearound, a cushion member mounted around the edge of the cup and adapted to effect a substantially air tight seal with the region of the head surrounding the ear, a rigid annular disc member connected at its periphery to the walls of the cup, a driver unit mounted in a central opening in the annular disc member, said driver unit having its sound emitting surface spaced from but facing the ear and being mounted so as to radiate sound both towards the ear and into the cavity, said disc member and driver unit forming a partition which divides the cavity into inner and outer sections, said partition adapted to give frequency dependent acoustic coupling between the sections such that the sound pressure penetrates the whole cavity at frequencies below 300 c.p.s. and substantially confines the sound pressure to the outer section adjacent the ear at frequencies above 3000 c.p.s.

6. An earphone as claimed in claim 5 wherein said partition includes an acoustic resistance which provides said frequency dependent acoustic coupling.

7. An earphone as claimed in claim 6 wherein said acoustic resistance comprises a plurality of relatively small holes in said annular disc.

8. An earphone as claimed in claim 6 wherein said acoustic resistance comprises at least one aperture in said annular disc, said aperture being covered by a material having interstices providing acoustic resistance.

9. An earphone as claimed in claim 5 wherein said partition includes an acoustic inertance providing said frequency dependent acoustic coupling.

10. An earphone as defined in claim 9 wherein said acoustic inertance comprises at least one aperture in said annular disc.

11. An earphone as claimed in claim 9 wherein said acoustic inertance comprises at least one aperture in said annular disc, said aperture being covered by a flexible membrane.

12. A circumaural type of earphone comprising a rigid, non-porous cup adapted to enclose the ear and define an acoustic cavity therearound, a cushion member mounted around the edge of the cup and adapted to effect a substantially air tight seal with the region of the head surrounding the ear, a rigid annular disc member connected at its periphery to the walls of the cup, a driver unit mounted in a central opening in the annular disc member, said driver unit having its sound emitting surface spaced from but facing the ear and being mounted so as to radiate sound both towards the ear and into the cavity, said disc member and driver unit forming a partition which divides the cavity into inner and outer sections, said partition adapted to give frequency dependent acoustic coupling between the sections such that the sound pressure penetrates the whole cavity at frequencies below 300 c.p.s. and substantially confines the sound pressure to the outer section adjacent the ear at frequencies above 3000 c.p.s., and porous sound absorbing material disposed in at least one of said sections.

13. An earphone as claimed in claim 12 wherein said partition includes an acoustic resistance providing said frequency dependent acoustic coupling.

14. An earphone as claimed in claim 13 wherein said acoustic resistance comprises a plurality of relatively small holes in said annular disc.

15. An earphone as claimed in claim 13 wherein said acoustic resistance comprises at least one aperture in said disc, said aperture being covered by a material having interstices providing acoustic resistance.

16. An earphone as claimed in claim 12 wherein said partition includes an acoustic inertance providing said frequency dependent acoustic coupling.

17. An earphone as claimed in claim 16 wherein said acoustic inertance comprises at least one aperture in said annular disc.

18. An earphone as claimed in claim 16 wherein said acoustic inertance comprises at least one aperture in said annular disc, said aperture being covered by a flexible membrane.

19. An earphone as claimed in claim 1 wherein said means comprises porous sound absorbing material disposed within the cup and occupying the region thereof surrounding the driver unit, and extending from about the periphery of the sound emitting surface to the periphery of the cup.

20. An earphone as claimed in claim 1 wherein said cup has an annular flange around the edge thereof and said means comprises an inner cup disposed within said cup, said inner cup having a plurality of ports around the edge thereof, said last named edge being attached to said flange; and porous sound absorbing material disposed within the space between the cups.

21. An earphone as claimed in claim 20 wherein porous sound absorbing material is also disposed within a portion of the inner cup.

22. A circumaural type of earphone comprising a rigid, non-porous cup adapted to enclose the ear and define an acoustic cavity therearound; a cushion member mounted around the edge of the cup and adapted to effect a substantially air tight seal with the region of the head surrounding the ear; an enclosed driver unit rigidly attached to the cup, said driver unit having its sound emitting surface spaced from but facing the ear and being mounted so as to radiate sound both towards the ear and into the cavity; an inner cup rigidly mounted within the cup; a plurality of ports disposed around the edge of the inner cup, and porous sound absorbing material disposed between the cups, said ports and material providing frequency dependent sound permeable means such that the sound pressure penetrates substantially the whole of the cavity at frequencies below 300 c.p.s. and is substantially confined to regions within the inner cup at frequencies above 3000 c.p.s.

References Cited in the file of this patent

UNITED STATES PATENTS

| | | |
|---|---|---|
| 1,365,425 | Shewhart | Jan. 11, 1921 |
| 2,468,721 | Volkmann | Apr. 26, 1949 |
| 2,603,724 | Kettler | July 15, 1952 |
| 2,621,261 | Karlsson et al. | Dec. 9, 1952 |
| 2,684,067 | Lienard | July 20, 1954 |
| 2,757,247 | Gavreau | July 31, 1956 |
| 2,946,862 | Wadsworth et al. | July 26, 1960 |
| 2,977,426 | Noyes et al. | Mar. 28, 1961 |
| 2,989,598 | Touger et al. | June 20, 1961 |